(12) United States Patent
Gordon

(10) Patent No.: US 7,154,069 B1
(45) Date of Patent: Dec. 26, 2006

(54) COOKING APPARATUS AND METHODS OF EMPLOYING SUCH APPARATUS

(75) Inventor: Jerry Gordon, Tulsa, OK (US)

(73) Assignee: Henny Penny Corporation, Eaton, OH (US)

(*) Notice: Subject to any disclaimer, the term of this patent is extended or adjusted under 35 U.S.C. 154(b) by 839 days.

(21) Appl. No.: 10/235,912

(22) Filed: Sep. 6, 2002

Related U.S. Application Data (60) Provisional application No. 60/330,764, filed on Oct. 30, 2001.

(51) Int. Cl.
*A47J 27/08* (2006.01)
*A47J 37/12* (2006.01)

(52) U.S. Cl. .............. 219/440; 99/403; 126/374.1; 126/376.1; 126/389.1; 220/203.29; 220/211; 220/222

(58) Field of Classification Search .............. None
See application file for complete search history.

(56) References Cited

U.S. PATENT DOCUMENTS

| | | | | |
|---|---|---|---|---|
| 2,472,451 A | * | 6/1949 | Whitney | 219/431 |
| 2,938,648 A | * | 5/1960 | Phelan et al. | 220/316 |
| 2,942,753 A | * | 6/1960 | Kelton | 220/816 |
| 3,635,722 A | * | 1/1972 | Moore | 426/438 |
| 3,821,925 A | * | 7/1974 | Moore | 99/327 |
| 4,768,426 A | | 9/1988 | Nett | |
| 4,798,939 A | * | 1/1989 | Nett | 219/438 |
| 4,928,664 A | | 5/1990 | Nishino et al. | |
| 4,930,408 A | | 6/1990 | King et al. | |
| 4,932,550 A | * | 6/1990 | Moucha | 220/203.09 |
| 5,011,035 A | * | 4/1991 | Subramanian | 220/203.29 |
| 5,038,753 A | | 8/1991 | Yokoyama et al. | |
| D336,007 S | | 6/1993 | King et al. | |
| 5,232,151 A | | 8/1993 | Mercer et al. | |
| 5,297,473 A | * | 3/1994 | Thelen et al. | 99/337 |
| 5,402,712 A | | 4/1995 | King et al. | |
| 5,402,713 A | | 4/1995 | King | |
| 5,743,175 A | | 4/1998 | Crain et al. | |
| 5,927,183 A | * | 7/1999 | Lee | 99/337 |
| 5,973,297 A | | 10/1999 | Winter et al. | |
| 5,974,955 A | | 11/1999 | King et al. | |
| 6,009,795 A | | 1/2000 | Werts | |
| 6,112,646 A | | 9/2000 | King et al. | |
| 6,283,015 B1 | * | 9/2001 | Kwon et al. | 99/337 |
| 6,336,395 B1 | | 1/2002 | Tiszai | |
| 6,820,536 B1 | * | 11/2004 | Kijimoto | 99/330 |

* cited by examiner

*Primary Examiner*—Joseph Pelham
(74) *Attorney, Agent, or Firm*—Baker Botts L.L.P.

(57) ABSTRACT

A cooking apparatus includes a cooking vessel and a lid for covering the cooking vessel. The cooking apparatus also may include an exhaust tube for bleeding off pressure within the cooking vessel, in which a portion of the exhaust tube is positioned above the lid when said lid covers said cooking vessel. In another embodiment, the cooking apparatus includes a first O-ring gaskets for forming a first seal between the cooking vessel and the lid, and a second O-ring gasket for forming a second seal between the cooking vessel and the lid. A method for reducing pressure includes the steps of providing a vessel and covering the vessel with a lid. The method also includes the steps of positioning a portion of an exhaust tube above the lid when the lid covers the vessel and bleeding off at least a portion of the pressure inside the vessel through the exhaust tube.

57 Claims, 9 Drawing Sheets

COOKING APPARATUS AND METHODS OF EMPLOYING SUCH APPARATUS

The present application claims priority from U.S. Provisional Patent Application No. 60/330,764 filed Oct. 30, 2001, entitled "Cooking Apparatus and Methods of Employing such Apparatus," the disclosure of which is incorporated herein by reference in its entirety.

BACKGROUND OF THE INVENTION

1. Field of the Invention

The present invention relates generally to the field of cooking apparatus and methods of employing such cooking apparatus. More specifically, the invention relates to pressurized fryers and methods for employing such pressurized fryers to cook food products.

2. Description of Related Art

Known pressurized fryers may include a cooking vessel, and a cooking liquid, such as water, oil, shortening, or the like, may be disposed within the cooking vessel. Moreover, uncooked food products, such as chicken, fish, potato products, or the like, may be disposed in the cooking liquid within the cooking vessel. The vessel subsequently may be covered with a lid, the lid may be manually latched to the cooking vessel, and food products disposed within the cooking vessel may be cooked. Covering the cooking vessel during the cooking process may increase pressure inside the cooking vessel, which may decrease an amount of time needed to cook the food product. Nevertheless, during the cooking process, the pressure inside the cooking vessel may increase above a desired level. Moreover, when the cooking process is complete, i.e., when the food product is cooked, it may be desirable to reduce the pressure inside the vessel to about 0 pounds per square inch gage ("psig") before retrieving the cooked product.

In order to reduce or bleed off pressure from the cooking vessel during the cooking process, or alternatively, subsequent to the completion of the cooking process, known pressurized fryers may include an exhaust tube having an opening formed therethrough. The exhaust tube may be disposed within the cooking vessel and also may be positioned below the lid. The exhaust tube also may be connected to a pressure regulator positioned outside the cooking vessel, such that the pressure regulator may control the pressure inside the cooking vessel via the exhaust tube. Nevertheless, during the cooking process, when uncooked food products are added to the cooking fluid, the cooking fluid may become agitated, which causes gases to release from the cooking fluid, such that a portion of the cooking fluid may become suspended in air within the cooking vessel. Moreover, the cooking fluid may enter or become disposed in the opening of the exhaust tube, which may increase a frequency with which the exhaust tube may need to be cleaned.

In order to maintain the pressure inside the cooking vessel during the cooking process, known pressurized fryers also may include a seal between the cooking vessel and the lid covering the cooking vessel. When the cooking process is completed, the seal may be broken, and the lid may be raised, such that cooked food products may be retrieved from the cooking vessel. Nevertheless, if the seal between the cooking vessel and the lid is broken before the pressure inside the cooking vessel is about 0 psig, steam created by the pressure inside the cooking vessel may rise from the uncovered cooking vessel. The steam may condense on the fryer, and also may condense on any machinery located proximately to the fryer. Moreover, unless the pressure inside the cooking vessel is reduced to about 0 psig before breaking the seal, the cooking fluid inside the cooking vessel still may be agitated when the seal is broken.

When the pressure inside the fryer is reduced to about 0 psig, known pressurized fryers also may include means for manually raising the lid in order to retrieve cooked food products. For example, known pressurized fryers may include a handle for manually raising the lid.

SUMMARY OF THE INVENTION

Therefore, a need has arisen for cooking apparatus and methods of employing such cooking apparatus that overcome these and other shortcomings of the related art. A technical advantage of the present invention is that an amount of suspended cooking fluid entering an opening of an exhaust tube may be reduced or eliminated. Another technical advantage of the present invention is that the raising of a lid covering a cooking vessel may begin before a pressure inside the cooking vessel is about 0 psig, which may decrease an amount of time between the completion of the cooking cycle and the raising of the lid. Still another technical advantage of the present invention is that the lid covering the cooking vessel may be mechanically raised or lowered.

According to an embodiment of the present invention, a cooking apparatus is described. The cooking apparatus comprises a cooking vessel and a lid for covering the cooking vessel. The cooking apparatus also may comprise an exhaust tube for reducing or bleeding off pressure within the cooking vessel, in which at least a portion of the exhaust tube is positioned above the lid when the lid covers the cooking vessel. In another embodiment, the cooking apparatus further may comprise a first sealing means, e.g. a first pair of O-ring gaskets, for forming a first seal between the cooking vessel and the lid, and a second sealing means, e.g., a second pair of O-rings, for forming a second seal between the cooking vessel and the lid. In yet another embodiment, the cooking apparatus further may comprise a first vertical rod connected to the lid and a gear rack connected to at least a portion of the first vertical rod. In this embodiment, the cooking apparatus also may comprise a first gear, which may comprise a first plurality of gear teeth, in which the first gear teeth engage the gear rack. Moreover, the cooking apparatus may comprise means for rotating the first gear, e.g., a second gear engaging the first gear and a motor coupled to the second gear, in which the rotation of the first gear raises or lowers the lid.

According to another embodiment of the present invention, a method for reducing pressure is described. The method comprises the steps of providing a vessel and covering the vessel with a lid. The method also comprises the steps of positioning at least a portion of an exhaust tube above the lid when the lid covers the vessel and reducing or bleeding off at least a portion of the pressure inside the vessel through the exhaust tube.

According to yet another embodiment of the present invention, a method for covering a vessel is described. The method comprises the steps of providing a vessel, covering the vessel with a lid, forming a first seal between the vessel and the lid, and forming a second seal between the vessel and the lid.

According to still another embodiment of the present invention, a method for moving a lid relative to a vessel is described. The method comprises the steps of providing a vessel and covering the vessel when a lid is lowered onto the vessel. The method also comprises the steps of connecting a first vertical rod to the lid and connecting a gear rack to at least a portion of the first vertical rod. The method further comprises the step of engaging a first gear with the gear rack, in which the first gear comprises a plurality of first teeth and the first plurality of gear teeth engage the gear rack. Moreover, the method comprises the step of rotating the first gear, which raises or lowers the lid.

Other objects, features, and advantages will be apparent to persons of ordinary skill in the art in view of the following detailed description of the invention and the accompanying drawings.

BRIEF DESCRIPTION OF THE DRAWINGS

For a more complete understanding of the present invention, needs satisfied thereby, and objects, features, and advantages thereof, reference now is made to the following descriptions taken in connection with the accompanying drawings.

DETAILED DESCRIPTION OF PREFERRED EMBODIMENTS

Preferred embodiments of the present invention and their advantages may be understood by referring to FIGS. 1–9, like numerals being used for like corresponding parts in the various drawings.

Figure 1:
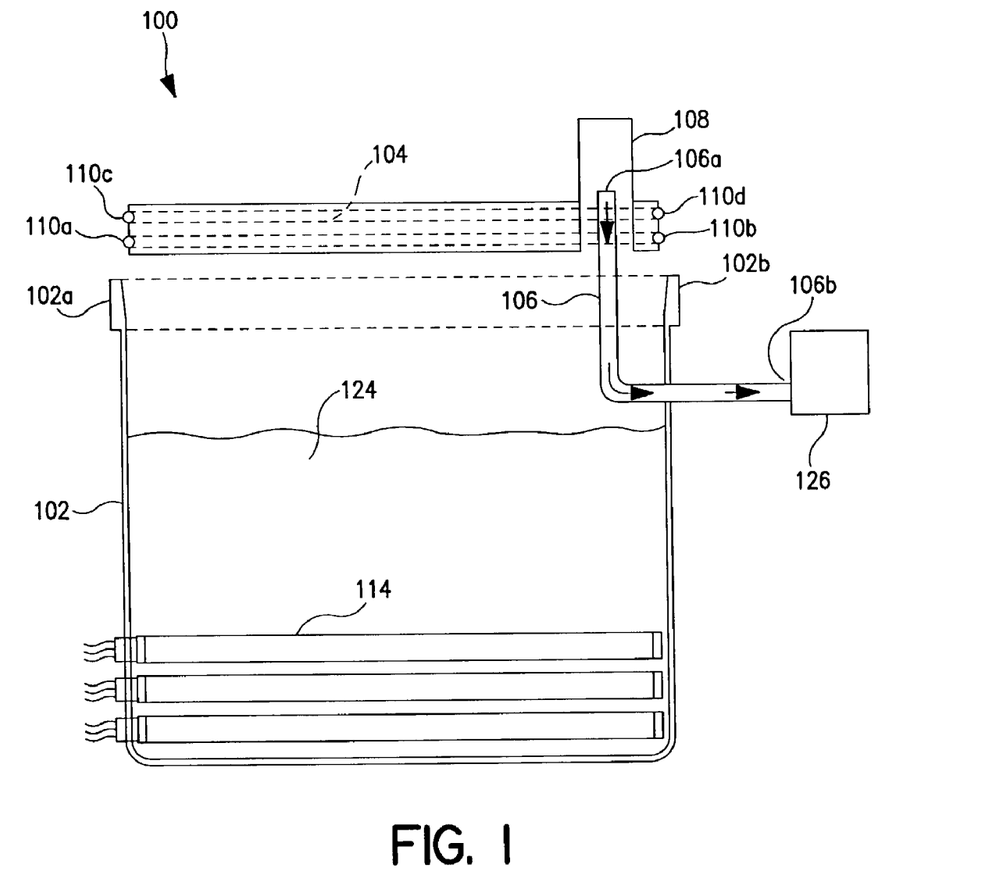
FIG. 1 is a side view of a cooking apparatus according to an embodiment of the present invention.

Referring to FIG. 1, a cooking apparatus 100 is described. Cooking apparatus 100 may be a fryer, such as a pressurized fryer, pressurized deep fat fryer, or the like. Cooking apparatus 100 may comprise a cooking vessel 102, which may be any vessel suitable for holding a cooking fluid 124, such as water, oil, shortening, or the like. Cooking apparatus 100 also may comprise means for heating cooking fluid 124, such as a plurality of heating elements 114, and a lid 104, which may be lowered onto cooking vessel 102, such that lid 104 may cover cooking vessel 102. Cooking apparatus 100 further may comprise an exhaust tube 106 for reducing or bleeding off a pressure inside cooking vessel 102 when cooking vessel 102 is covered by lid 104. For example, exhaust tube 106 may be positioned substantially adjacent to a rear end of lid 104. Moreover, when lid 104 covers cooking vessel 102, a first end 106a of exhaust tube 106, having an opening formed therethrough, may be positioned above lid 104.

In an embodiment, cooking apparatus 100 also may comprise a cap member 108 connected to or sealed to lid 104, such that at least a portion of cap member 108 may be positioned above lid 104. In this embodiment, cap member 108 may be positioned such that when lid 104 covers cooking vessel 102, at least a portion of first end 106a of exhaust tube 106 may be disposed within cap member 108 and first end 106a may be substantially surrounded by cap member 108.

During a cooking cycle, when uncooked food products, such as chicken, fish, potato products, or the like, is added to cooking fluid 124, cooking fluid 124 may become agitated. When cooking fluid 124 is agitated, gases may release from cooking fluid 124, such that a portion of cooking fluid 124 may become suspended in air within the cooking vessel. Nevertheless, positioning exhaust tube 106 above lid 104 may reduce an amount of suspended cooking fluid 124 which may enter the opening of first end 106a of exhaust tube 106. Moreover, disposing exhaust tube 106 within cap member 108 may allow exhaust tube 106 to be positioned substantially above lid 104 without uncovering cooking vessel 102. The proximity of cap member 108 to first end 106a also may decrease an amount of suspended cooking fluid 124 which may enter the opening of first end 106a by substantially surrounding first end 106a without closing the opening of first end 106a.

In another embodiment, cooking apparatus 100 further may comprise a pressure regulator 126, which may be positioned outside cooking apparatus 100. Pressure regulator 126 may be connected to a second end 106b of exhaust tube 106, which may be formed substantially opposite first end 106a. Moreover, second end 106b of exhaust tube 106 may be connected to or may be in communication with pressure regulator 126, which may allow pressure regulator 126 to control an amount of pressure inside cooking vessel 102 via exhaust tube 106.

For example, prior to the cooking cycle, cooking fluid 124 and food products (not shown) may be disposed within cooking vessel 102, and lid 104 may be lowered in order to cover cooking vessel 102. When cooking vessel 102 is covered, the cooking cycle may begin, during which pressure inside cooking vessel 102 may increase. Increasing the pressure inside cooking vessel 102 may decrease a cooking time of the food products. Nevertheless, during the cooking process, the amount of pressure inside cooking vessel 102 may increase above a desired pressure level. When the cooking pressure increases above the desired pressure level, pressure regulator 126 may operate to decrease the pressure inside cooking vessel 102 by reducing or bleeding off the pressure through the opening of first end 106a of exhaust tube 106. Moreover, in order to retrieve cooked food products from cooking vessel 102 after the completion of the cooking cycle, it may be desirable to reduce the pressure inside cooking vessel 102 to about 0 psig. Consequently, after the completion of the cooking cycle, pressure regulator 126 also may decrease the pressure inside cooking vessel 102 to about 0 psig by reducing or bleeding off the pressure through the opening of first end 106a.

In yet another embodiment of the present invention, cooking vessel 102 may comprise a substantially circular or oval top portion or lip portion, which may comprise a first tapered portion 102a and a second tapered portion 102b. For example, substantially the entire lip portion may be substantially tapered, such that first tapered portion 102a and second tapered portion 102b may be any two portions formed substantially opposite each other. Moreover, cooking apparatus 100 further may comprise a first sealing means for forming a first seal between cooking vessel 102 and lid 104. For example, the first sealing means may comprise a first contact means, e.g., a first contact point 110a, formed on or around lid 104. The first contact means further may comprise a second contact point 110b, which may be formed substantially opposite first contact point 110a.

In an embodiment, the first contact means may comprise a substantially circular or oval element formed on or around lid 104. In this embodiment, first contact point 110a and second contact point 110b may be any two points along the first contact means formed substantially opposite each other.

In operation, when lid 104 is lowered in order to cover cooking vessel 102, first contact point 110a may contact first tapered portion 102a at substantially the same time that second contact point 110b may contact second tapered portion 102b. Moreover, the contact between first tapered portion 102a and first contact point 110a, and the contact between second tapered portion 102b and second contact point 110b, may form the first seal between cooking apparatus 102 and lid 104. In an embodiment, the first contact means may comprise a first O-ring gasket formed on or around lid 104. Nevertheless, it will be understood by those of ordinary skill in the art that the first contact means may be any element suitable for forming a seal between cooking apparatus 102 and lid 104 when contacted with first tapered portion 102a and second tapered portion 102b, respectively.

Cooking apparatus 100 further may comprise a second sealing means for forming a second seal between cooking vessel 102 and lid 104. For example, the second sealing means may comprise a second contact means, e.g., a third contact point 110c, formed on or around lid 104. The second contact means also may comprise a fourth contact point 110d, which may be formed substantially opposite third contact point 110c. Moreover, it will be understood by those of ordinary skill in the art that the second contact means may be substantially similar to the first contact means, except that the second contact means may be positioned above the first contact means.

In operation, when lid 104 is lowered in order to cover cooking vessel 102, third contact point 110c may contact first tapered portion 102a at substantially the same instance that fourth contact point 110d may contact second tapered portion 102b. Moreover, the contact between first tapered portion 102a and third contact point 110c, and the contact between second tapered portion 102b and fourth contact point 110d, may form the second seal between cooking apparatus 102 and lid 104. In an embodiment, the second contact means may comprise a second O-ring gasket formed on or around lid 104. Nevertheless, it will be understood by those of ordinary skill in the art that the second contact means may be any element suitable for forming a seal between cooking apparatus 102 and lid 104 when contacted with first tapered portion 102a and second tapered portion 102, respectively.

In any of the above-described embodiments, third contact point 110c may be positioned above first contact point 110a, and fourth contact point 110d may be positioned above second contact point 10b. When lid 104 is lowered to cover cooking vessel 102, first contact point 110a and second contact point 110b may contact first tapered portion 102a and second tapered portion 102b, respectively, which may form the first seal between cooking vessel 102 and lid 104. Moreover, the first seal between cooking vessel 102 and lid 104 may be formed prior to the formation of the second seal between cooking vessel 102 and lid 104. Specifically, subsequent to the formation of the first seal, lid 104 further may be lowered in order to cover cooking vessel 102. The lowering of lid 104 after the formation of the first seal may allow third contact point 110c and fourth contact means 104d to contact first tapered portion 102a and second tapered portion 102b, respectively, which may form the second seal between cooking vessel 102 and lid 104.

In any of the above-described embodiments, subsequent to the formation of the first seal and the second seal between cooking vessel 102 and lid 104, the cooking process may begin, i.e., food products previously disposed within cooking vessel 102 may be cooked. When the cooking cycle is complete, i.e., when the food product disposed within cooking vessel 102 is cooked, it may be desirable to retrieve the food product from cooking vessel 102. The formation of the first seal and the formation of the second seal between cooking vessel 102 and lid 104 may reduce an amount time between the completion of the cooking cycle and the raising of lid 104. As such, an amount of time between the completion of the cooking cycle and the retrieval of the food product also may be reduced. Specifically, lid 104 may be raised such that the second seal between cooking vessel 102 and lid 104 may be broken when the pressure inside cooking vessel 102 is greater than 0 psig.

Although the second seal may be broken when the pressure inside cooking vessel 102 is greater than 0 psig, the first seal may remain intact until the pressure inside cooking vessel 102 is reduced to about 0 psig. Specifically, the second seal may be broken when the pressure inside cooking vessel 102 is reduced to a level such that when lid 104 is raised, the first seal remains intact until the pressure inside cooking vessel 102 is about 0 psig. For example, the second seal may be broken when the pressure inside cooking vessel 102 is about 2 psig. Nevertheless, it will be understood by those of ordinary skill in the art that the pressure level inside cooking vessel 102 at which the second seal may be broken without causing the first seal to break prior to the reduction of pressure inside cooking vessel 102 to about 0 psig, may depend on a number of factors, such as the speed at which lid 104 is raised and the distance between the first sealing means and the second sealing means.

Figure 2:
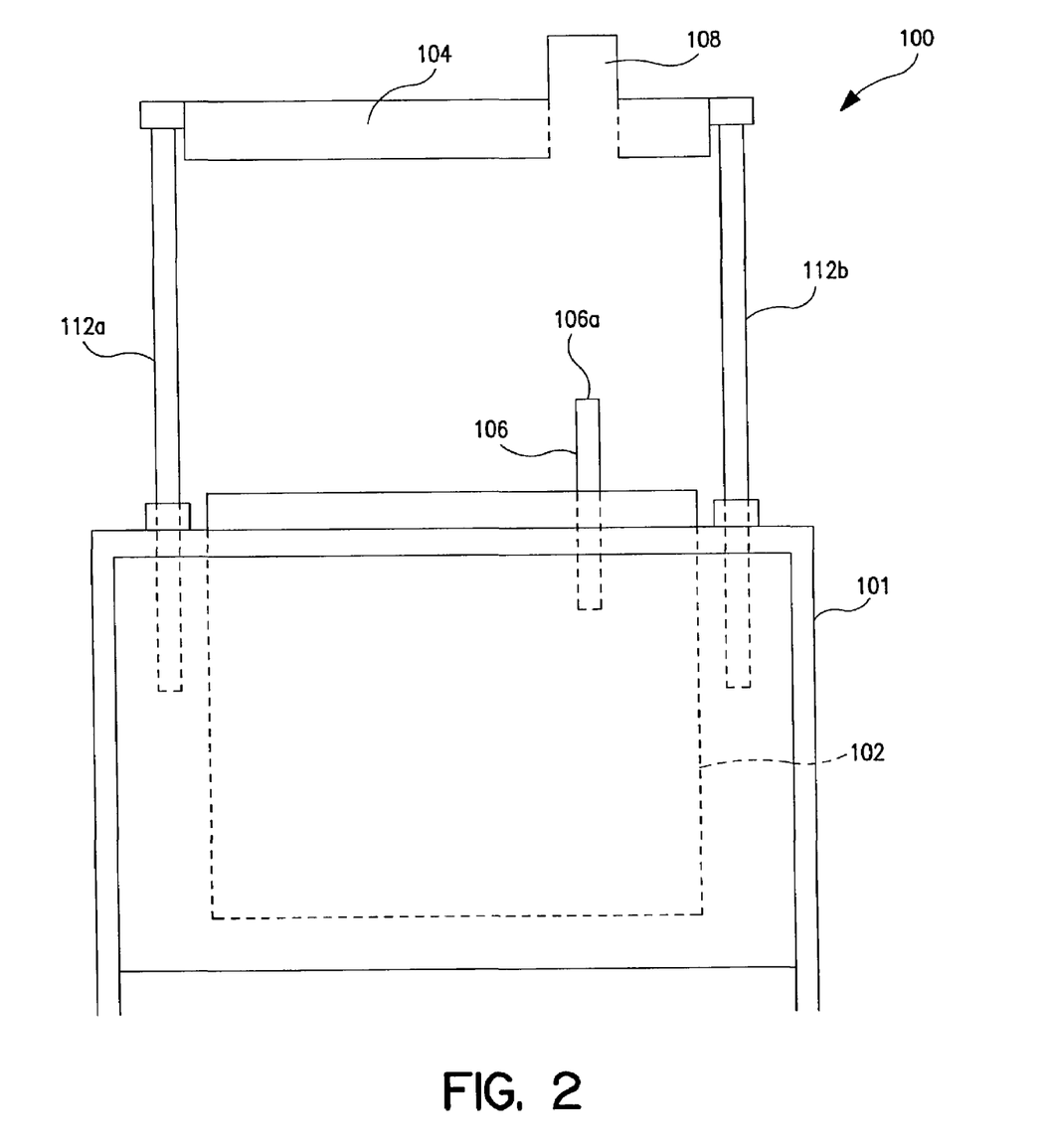
FIG. 2 is a front view of a cooking apparatus according to an embodiment of the present invention.
Figure 3:
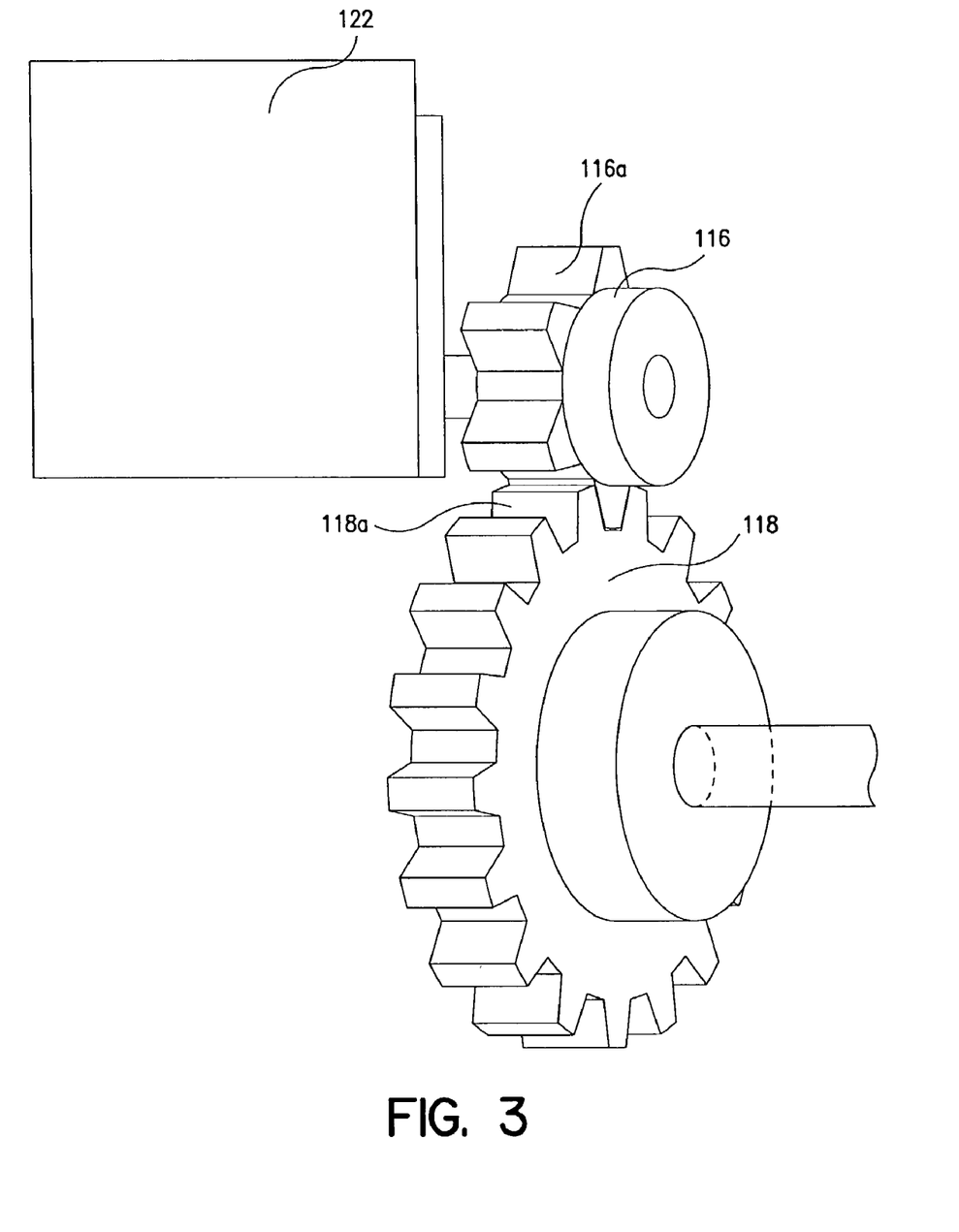
FIG. 3 is a perspective view of a gear and means for rotating the gear of a cooking apparatus according to an embodiment of the present invention.
Figure 4:
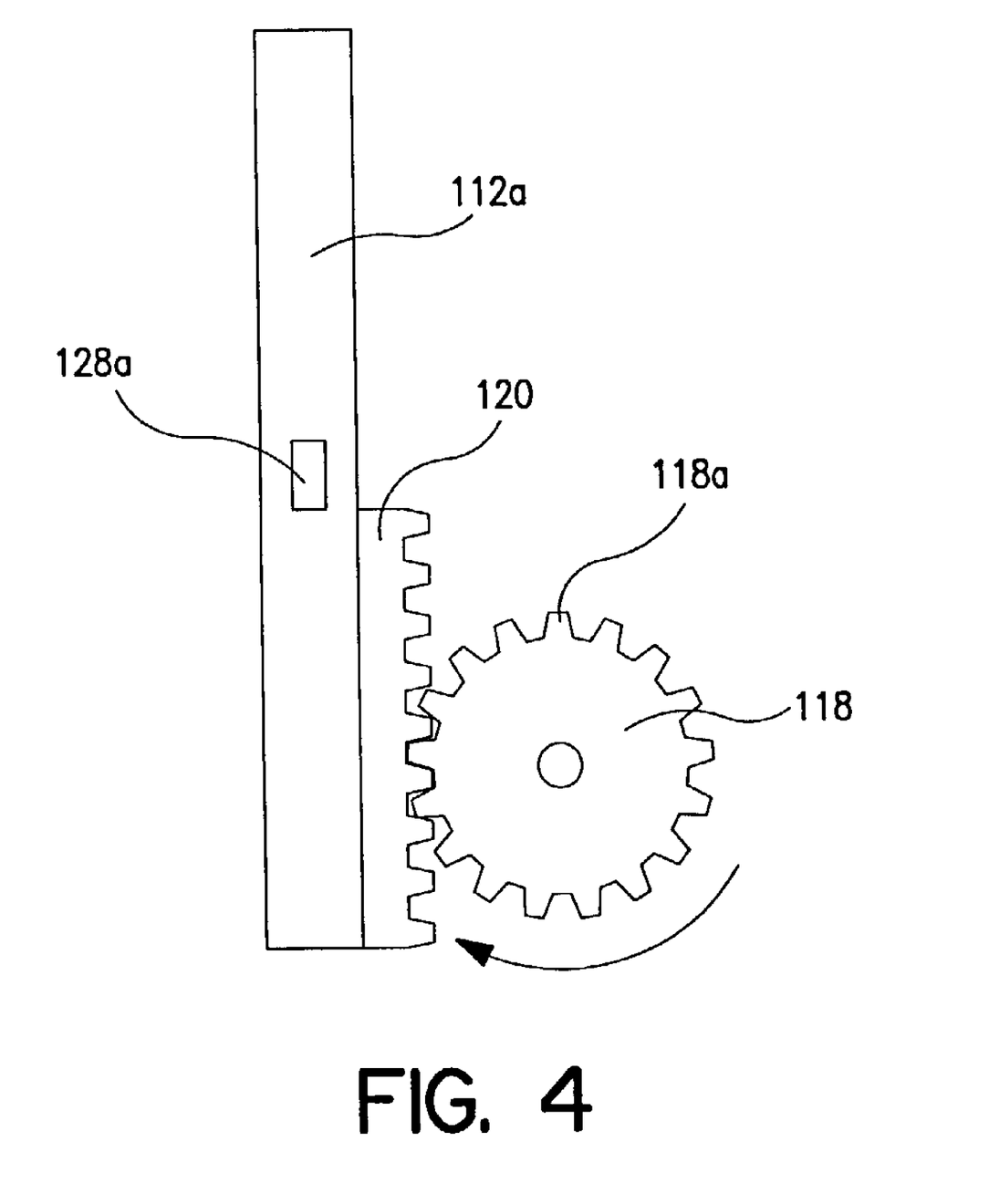
FIG. 4 is a side view of the gear shown in FIG. 3 engaged with a gear rack of a cooking apparatus according to an embodiment of the present invention.

Referring to FIGS. 2–4, cooking apparatus 100 also may comprise a cooking apparatus housing 101, which may enclose at least a portion of cooking vessel 102. Cooking apparatus 100 further may comprise a first vertical rod 112a, and at least a portion of first vertical rod 112a may be directly or indirectly connected to lid 104. Moreover, cooking apparatus 100 may comprise a gear rack 120, and at least a portion of gear rack 120 may be connected to at least a portion of vertical rod 112a. For example, gear rack 120 may be entirely connected to a lower end of vertical rod 112a. Alternatively, an upper end of gear rack 120 may be connected to the lower end of vertical rod 112a, such that a lower end of gear rack 120 may positioned below the lower end of vertical rod 112a. Cooking apparatus 100 also may comprise a first gear 118, which may comprise a plurality of gear teeth 118a. Moreover, cooking apparatus 100 may comprise means for rotating first gear 118, such that a rotation of first gear 118 may engage gear teeth 118a with gear rack 120. Specifically, when first gear 118 rotates, gear teeth 118a may engage gear rack 120, and first vertical rod 112a may be raised or lowered, which also may raise or lower lid 104. It will be understood by those of ordinary skill in the art that whether lid 104 is raised or lowered may depend on whether first gear 118 rotates in a clockwise or a counterclockwise direction.

In any of the above-described embodiments, the means for rotating first gear 118 may comprise a second gear 116, which may comprise a second plurality of gear teeth 116a. The means for rotating first gear 118 also may comprise a motor 122 coupled to second gear 116. For example, motor 122 may rotate second gear 116. When second gear 116 rotates, gear teeth 116a may engage gear teeth 118a. Engaging gear teeth 116a with gear teeth 118a may cause first gear 118 to rotate. When first gear 118 rotates, gear teeth 118a may engage gear rack 120, and first vertical rod 112a may be raised or lowered, which also may raise or lower lid 104. It will be understood by those of ordinary skill in the art that whether lid 104 is raised or lowered may depend on whether second gear 116 rotates in a clockwise or a counterclockwise direction.

Cooking apparatus 100 also may comprise a second vertical rod 112b, and at least a portion of second vertical rod 112b may be directly or indirectly connected to lid 104. Second vertical rod 112b may be positioned substantially opposite first vertical rod 112a. Moreover, a lower end of second vertical rod 112b may be connected to gear rack 120 in a manner substantially similar to the connection between first vertical rod 112a and gear rack 120. Therefore, the connection between second vertical rod 112b and gear rack 120 will not be discussed in detail.

In any of the above-described embodiments, cooking apparatus 100 also may comprise a first proximity sensor 128a connected to or disposed on first vertical rod 112a. First proximity sensor 128a may monitor a position of first vertical rod 112a when first vertical rod 112a is raised or lowered. Similarly, cooking apparatus 100 also may comprise a second proximity sensor (not shown) connected to or disposed on second vertical rod 112b. The second proximity sensor may monitor a position of second vertical rod 112b when first vertical rod 112b is raised or lowered.

In operation, subsequent to the formation of the first seal and the second seal between cooking vessel 102 and lid 104, the cooking process may begin, i.e., the food product previously disposed within cooking vessel 102 may be cooked. When the cooking cycle is complete, i.e., when food products disposed within cooking vessel 102 is cooked, it may be desirable to retrieve the cooked food product from cooking vessel 102. In order to retrieve the cooked food product, lid 104 may be raised, such that the first seal and the second seal between cooking vessel 102 and lid 104 may be broken. When the first seal and the second seal are broken, lid 104 further may be raised and cooking vessel 102 may be uncovered. Specifically, when the cooking process is complete, motor 122 may rotate second gear 116. When second gear 116 rotates, gear teeth 116a may engage gear teeth 118a. Engaging gear teeth 116a with gear teeth 118a may cause first gear 118 to rotate. When first gear 118 rotates, gear teeth 118a may engage gear rack 120, and first vertical rod 112a may be raised, which also may raise lid 104. In an embodiment, motor 122 may rotate second gear 116, such that the second seal between cooking vessel 102 and lid 104 is broken when the pressure inside cooking vessel 102 is greater than 0 psig. For example, the pressure inside cooking vessel 102 may be about 2 psig. Moreover, motor 122 may rotate second gear 116, such that the first seal between cooking vessel 102 and lid 104 is broken when the pressure inside cooking vessel 102 is about 0 psig. When the first and second seal are broken, motor 122 may continue to rotate second gear 116 such that lid 104 is raised substantially above cooking vessel 102. When lid 104 reaches a predetermined height, first proximity sensor 128a may communicate with motor 122 in order to disengage motor 122, such that the raising of lid 104 may stop when lid 104 reaches the predetermined height. Similarly, when lid 104 reaches a predetermined height, first proximity sensor 128a may communicate with motor 122 in order to disengage motor 122.

Subsequent to lid 104 reaching the predetermined height, the cooked food product may be removed from cooking vessel 102, and a new food product subsequently may be disposed within cooking vessel 102. Motor 122 may rotate second gear 116 in order to lower lid 104 such that the first seal between cooking vessel 102 and lid 104 and the second seal between cooking vessel 102 and lid 104 may be created when lid 104 covers cooking vessel 102. After the formation of the first seal and the second seal, first proximity sensor 128a or the second proximity sensor, or both, may disengage motor 122. Moreover, during the cooking process, the engagement between gear teeth 118a and gear rack 120 may serve as a latching mechanism, which may maintain the first seal and the second seal between cooking vessel 102 and lid 104 during the cooking process.

In an alternative embodiment of the present invention, a cooking apparatus 100 may comprise a cooking vessel 102, which may be any vessel suitable for holding a cooking fluid 124, such as water, oil, shortening, or the like. Cooking apparatus 100 also may comprise means for heating cooking fluid 124, such as a plurality of heating elements 114, and a lid 104, which may be lowered onto cooking vessel 102, such that lid 104 may cover cooking vessel 102.

In this embodiment, cooking vessel 102 may comprise a substantially circular or oval top portion or lip portion, which may comprise a first tapered portion 102a and a second tapered portion 102b. For example, substantially the entire lip portion may be substantially tapered, such that first tapered portion 102a and second tapered portion 102b may be any two portions formed substantially opposite each other. Moreover, cooking apparatus 100 further may comprise a first sealing means for forming a first seal between cooking vessel 102 and lid 104. For example, the first sealing means may comprise a first contact means formed on or around lid 104, which may comprise a first contact point 110a. The first contact means further may comprise a second contact point 110b, which may be formed substantially opposite first contact point 110a. In an embodiment, the first contact means may comprise a substantially circular or oval element formed on or around lid 104. In this embodiment, first contact point 110a and second contact point 110b may be any two points along the first contact means formed substantially opposite each other.

In operation, when lid 104 is lowered in order to cover cooking vessel 102, first contact point 110a may contact first tapered portion 102a at substantially the same time that second contact point 110b may contact second tapered portion 102b. Moreover, the contact between first tapered portion 102a and first contact point 110a, and the contact between second tapered portion 102b and second contact point 110b, may form the first seal between cooking apparatus 102 and lid 104. In an embodiment, the first contact means may comprise a first O-ring gasket formed on or around lid 104. Nevertheless, it will be understood by those of ordinary skill in the art that the first contact means may be any element suitable for forming a seal between cooking apparatus 102 and lid 104 when contacted with first tapered portion 102a and second tapered portion 102b, respectively.

Cooking apparatus 100 further may comprise a second sealing means for forming a second seal between cooking vessel 102 and lid 104. For example, the second sealing means may comprise a second contact means formed on or around lid 104, which may comprise a third contact point 110c. The second contact means also may comprise a fourth contact point 110d, which may be formed substantially opposite third contact point 110c. Moreover, it will be understood by those of ordinary skill in the art that the second contact means may be substantially similar to the first contact means, except that the second contact means may be positioned above the first contact means.

In operation, when lid 104 is lowered in order to cover cooking vessel 102, third contact point 110c may contact first tapered portion 102a at substantially the same time that fourth contact point 110d may contact second tapered portion 102b. Moreover, the contact between first tapered portion 102a and third contact point 110c, and the contact between second tapered portion 102b and fourth contact point 110d, may form the second seal between cooking apparatus 102 and lid 104. In an embodiment, the second contact means may comprise a second O-ring gasket formed on or around lid 104. Nevertheless, it will be understood by those of ordinary skill in the art that the second contact means may be any element suitable for forming a seal between cooking apparatus 102 and lid 104 when contacted with first tapered portion 102a and second tapered portion 102, respectively.

In any of the above-described embodiments, third contact point 110c may be positioned above first contact point 110a, and fourth contact point 110d may be positioned above second contact point 110b. When lid 104 is lowered to cover cooking vessel 102, first contact point 110a and second contact point 110b may contact first tapered portion 102a and second tapered portion 102b, respectively, which may form the first seal between cooking vessel 102 and lid 104. Moreover, the first seal between cooking vessel 102 and lid 104 may be formed prior to the formation of the second seal between cooking vessel 102 and lid 104. Specifically, subsequent to the formation of the first seal, lid 104 further may be lowered in order to cover cooking vessel 102. The lowering of lid 104 after the formation of the first seal may allow third contact point 110c and fourth contact means 104d to contact first tapered portion 102a and second tapered portion 102b, respectively, which may form the second seal between cooking vessel 102 and lid 104.

In any of the above-described embodiments, subsequent to the formation of the first seal and the second seal between cooking vessel 102 and lid 104, the cooking process may begin, i.e., a food product previously disposed within cooking vessel 102 may be cooked. When the cooking cycle is complete, i.e., when the food product disposed within cooking vessel 102 is cooked, it may be desirable to retrieve the food product from cooking vessel 102. The formation of the first seal and the formation of the second seal between cooking vessel 102 and lid 104 may reduce an amount time between the completion of the cooking cycle and the raising of lid 104. As such, an amount of time between the completion of the cooking cycle and the retrieval of the food product also may be reduced. Specifically, lid 104 may be raised such that the second seal between cooking vessel 102 and lid 104 may be broken when the pressure inside cooking vessel 102 is greater than 0 psig. Nevertheless, although the second seal may be broken when the pressure inside cooking vessel 102 is greater than 0 psig, the first seal may remain intact until the pressure inside cooking vessel 102 is reduced to about 0 psig.

In particular, the second seal may be broken when the pressure inside cooking vessel 102 is reduced to a level such that when lid 104 is raised, the first seal remains intact until the pressure inside cooking vessel 102 is about 0 psig. For example, the second seal may be broken when the pressure inside cooking vessel 102 is about 2 psig. Nevertheless, it will be understood by those of ordinary skill in the art that the pressure level inside cooking vessel 102 at which the second seal may be broken without causing the first seal to break prior to the reduction of pressure inside cooking vessel 102 to about 0 psig, may depend on a number of factors, such as the speed at which lid 104 is raised and the distance between the first sealing means and the second sealing means.

Referring to FIGS. 2–4, cooking apparatus 100 also may comprise a cooking apparatus housing 101, which may enclose at least a portion of cooking vessel 102. Cooking apparatus 100 further may comprise a first vertical rod 112a, and at least a portion of first vertical rod 112a may be directly or indirectly connected to lid 104. Moreover, cooking apparatus 100 may comprise a gear rack 120, and at least a portion of gear rack 120 may be connected to at least a portion of vertical rod 112a. For example, gear rack 120 may be entirely connected to a lower end of vertical rod 112a. Alternatively, an upper end of gear rack 120 may be connected to the lower end of vertical rod 112a, such that a lower end of gear rack 120 may positioned below the lower end of vertical rod 112a. Cooking apparatus 100 also may comprise a first gear 118, which may comprise a plurality of gear teeth 118a. Moreover, cooking apparatus 100 may comprise means for rotating first gear 118, such that a rotation of first gear 118 may engage gear teeth 118a with gear rack 120. Specifically, when first gear 118 rotates, gear teeth 118a may engage gear rack 120, and first vertical rod 112a may be raised or lowered, which also may raise or lower lid 104. It will be understood by those of ordinary skill in the art that whether lid 104 is raised or lowered may depend on whether first gear 118 rotates in a clockwise or a counterclockwise direction.

In any of the above-described embodiments, the means for rotating first gear 118 may comprise a second gear 116, which may comprise a second plurality of gear teeth 116a. The means for rotating first gear 118 also may comprise a motor 122 coupled to second gear 116. For example, motor 122 may rotate second gear 116. When second gear 116 rotates, gear teeth 116a may engage gear teeth 118a. Engaging gear teeth 116a with gear teeth 118a may cause first gear 118 to rotate. When first gear 118 rotates, gear teeth 118a may engage gear rack 120, and first vertical rod 112a may be raised or lowered, which also may raise or lower lid 104. It will be understood by those of ordinary skill in the art that whether lid 104 is raised or lowered may depend on whether second gear 116 rotates in a clockwise or a counterclockwise direction.

Cooking apparatus 100 also may comprise a second vertical rod 112b, and at least a portion of second vertical rod 112b may be directly or indirectly connected to lid 104. Second vertical rod 112b may be positioned substantially opposite first vertical rod 112a. Moreover, a lower end of second vertical rod 112b may be connected to gear rack 120 in a manner substantially similar to the connection between first vertical rod 112a and gear rack 120. Therefore, the connection between second vertical rod 112b and gear rack 120 will not be discussed in detail.

In any of the above-described embodiments, cooking apparatus 100 also may comprise a first proximity sensor 128a connected to or disposed on first vertical rod 112a. First proximity sensor 128a may monitor a position of first vertical rod 112a when first vertical rod 112a is raised or lowered. Similarly, cooking apparatus 100 also may comprise a second proximity sensor (not shown) connected to or disposed on second vertical rod 112b. The second proximity sensor may monitor a position of second vertical rod 112b when first vertical rod 112b is raised or lowered.

In operation, subsequent to the formation of the first seal and the second seal between cooking vessel 102 and lid 104, the cooking process may begin, i.e., the food product previously disposed within cooking vessel 102 may be cooked. When the cooking cycle is complete, i.e., when food products disposed within cooking vessel 102 is cooked, it may be desirable to retrieve the cooked food product from cooking vessel 102. In order to retrieve the cooked food product, lid 104 may be raised such that the first seal and the second seal between cooking vessel 102 and lid 104 may be broken. When the first seal and the second seal are broken, lid 104 further may be raised and cooking vessel 102 may be uncovered. Specifically, when the cooking process is complete, motor 122 may rotate second gear 116. When second gear 116 rotates, gear teeth 116a may engage gear teeth 118a. Engaging gear teeth 116a with gear teeth 118a may cause first gear 118 to rotate. When first gear 118 rotates, gear teeth 118a may engage gear rack 120, and first vertical rod 112a may be raised, which also may raise lid 104. In an embodiment, motor 122 may rotate second gear 116 such that the second seal between cooking vessel 102 and lid 104 is broken when the pressure inside cooking vessel 102 is greater than 0 psig. For example, the pressure inside cooking vessel 102 may be about 2 psig. Moreover, motor 122 may rotate second gear 116 such that the first seal between cooking vessel 102 and lid 104 is broken when the pressure inside cooking vessel 102 is about 0 psig. When the first and second seal are broken, motor 122 may continue to rotate second gear 116 such that lid 104 is raised substantially above cooking vessel 102. When lid 104 reaches a predetermined height, first proximity sensor 128a may communicate with motor 122 in order to disengage motor 122, such that the raising of lid 104 may stop when lid 104 reaches the predetermined height. Similarly, when lid 104 reaches a predetermined height, first proximity sensor 128a may communicate with motor 122 in order to disengage motor 122.

Subsequent to lid 104 reaching the predetermined height, the cooked food product may be removed from cooking vessel 102, and a new food product subsequently may be disposed within cooking vessel 102. Motor 122 may rotate second gear 116 in order to lower lid 104 such that the first seal between cooking vessel 102 and lid 104 and the second seal between cooking vessel 102 and lid 104 may be created when lid 104 covers cooking vessel 102. After the formation of the first seal and the second seal, first proximity sensor 128a or the second proximity sensor, or both, may disengage motor 122. Moreover, during the cooking process, the engagement between gear teeth 118a and gear rack 120 may serve as a latching mechanism, which may maintain the first seal and the second seal between cooking vessel 102 and lid 104 during the cooking process.

In yet another alternative embodiment of the present invention, a cooking apparatus 100 may comprise a cooking vessel 102, which may be any vessel suitable for holding a cooking fluid 124, such as water, oil, shortening, or the like. Cooking apparatus 100 also may comprise means for heating cooking fluid 124, such as a plurality of heating elements 114, and a lid 104, which may be lowered onto cooking vessel 102, such that lid 104 may cover cooking vessel 102.

Referring again to FIGS. 2–4, in this embodiment, cooking apparatus 100 also may comprise a cooking apparatus housing 101, which may enclose at least a portion of cooking vessel 102. Cooking apparatus 100 further may comprise a first vertical rod 112a, and at least a portion of first vertical rod 112a may be directly or indirectly connected to lid 104. Moreover, cooking apparatus 100 may comprise a gear rack 120, and at least a portion of gear rack 120 may be connected to at least a portion of vertical rod 112a. For example, gear rack 120 may be entirely connected to a lower end of vertical rod 112a. Alternatively, an upper end of gear rack 120 may be connected to the lower end of vertical rod 112a, such that a lower end of gear rack 120 may positioned below the lower end of vertical rod 112a. Cooking apparatus 100 also may comprise a first gear 118, which may comprise a plurality of gear teeth 118a. Moreover, cooking apparatus 100 may comprise means for rotating first gear 118, such that a rotation of first gear 118 may engage gear teeth 118a with gear rack 120. Specifically, when first gear 118 rotates, gear teeth 118a may engage gear rack 120, and first vertical rod 112a may be raised or lowered, which also may raise or lower lid 104. It will be understood by those of ordinary skill in the art that whether lid 104 is raised or lowered may depend on whether first gear 118 rotates in a clockwise or a counterclockwise direction.

In any of the above-described embodiments, the means for rotating first gear 118 may comprise a second gear 116, which may comprise a second plurality of gear teeth 116a. The means for rotating first gear 118 also may comprise a motor 122 coupled to second gear 116. For example, motor 122 may rotate second gear 116. When second gear 116 rotates, gear teeth 116a may engage gear teeth 118a. Engaging gear teeth 116a with gear teeth 118a may cause first gear 118 to rotate. When first gear 118 rotates, gear teeth 118a may engage gear rack 120, and first vertical rod 112a may be raised or lowered, which also may raise or lower lid 104. It will be understood by those of ordinary skill in the art that whether lid 104 is raised or lowered may depend on whether second gear 116 rotates in a clockwise or a counterclockwise direction.

Cooking apparatus 100 also may comprise a second vertical rod 112b, and at least a portion of second vertical rod 112b may be directly or indirectly connected to lid 104. Second vertical rod 112b may be positioned substantially opposite first vertical rod 112a. Moreover, a lower end of second vertical rod 112b may be connected to gear rack 120 in a manner substantially similar to the connection between first vertical rod 112a and gear rack 120. Therefore, the connection between second vertical rod 112b and gear rack 120 will not be discussed in detail.

In any of the above-described embodiments, cooking apparatus 100 also may comprise a first proximity sensor 128a connected to or disposed on first vertical rod 112a. First proximity sensor 128a may monitor a position of first vertical rod 112a when first vertical rod 112a is raised or lowered. Similarly, cooking apparatus 100 also may comprise a second proximity sensor (not shown) connected to or disposed on second vertical rod 112b. The second proximity sensor may monitor a position of second vertical rod 112b when first vertical rod 112b is raised or lowered.

In this embodiment, when a cooking cycle is complete, i.e., when a food product previously disposed within cooking vessel 102 is cooked, it may be desirable to retrieve the cooked food product from cooking vessel 102. In order to retrieve the cooked food product, lid 104 may be raised and cooking vessel 102 may be uncovered. Specifically, when the cooking process is complete, motor 122 may rotate second gear 116. When second gear 116 rotates, gear teeth 116a may engage gear teeth 118a. Engaging gear teeth 116a with gear teeth 118a may cause first gear 118 to rotate. When first gear 118 rotates, gear teeth 118a may engage gear rack 120, and first vertical rod 112a may be raised, which also may raise lid 104. Motor 122 may rotate second gear 116 until lid 104 reaches a predetermined height. When lid 104 reaches the predetermined height, first proximity sensor 128a may communicate with motor 122 in order to disengage motor 122, such that the raising of lid 104 may stop when lid 104 reaches the predetermined height. Similarly, when lid 104 reaches the predetermined height, first proximity sensor 128a may communicate with motor 122 in order to disengage motor 122.

Subsequent to lid 104 reaching the predetermined height, the cooked food product may be removed from cooking vessel 102, and a new food product subsequently may be disposed within cooking vessel 102. Motor 122 may rotate second gear 116 in order to lower lid 104 such that lid 104 covers cooking vessel 102. When lid 104 covers cooking vessel 102 sufficient to begin the cooking cycle, first proximity sensor 128a or the second proximity sensor, or both, may disengage motor 122. Moreover, during the cooking process, the engagement between gear teeth 118a and gear rack 120 may serve as a latching mechanism between lid 104 and cooking vessel 102.

Figure 5:
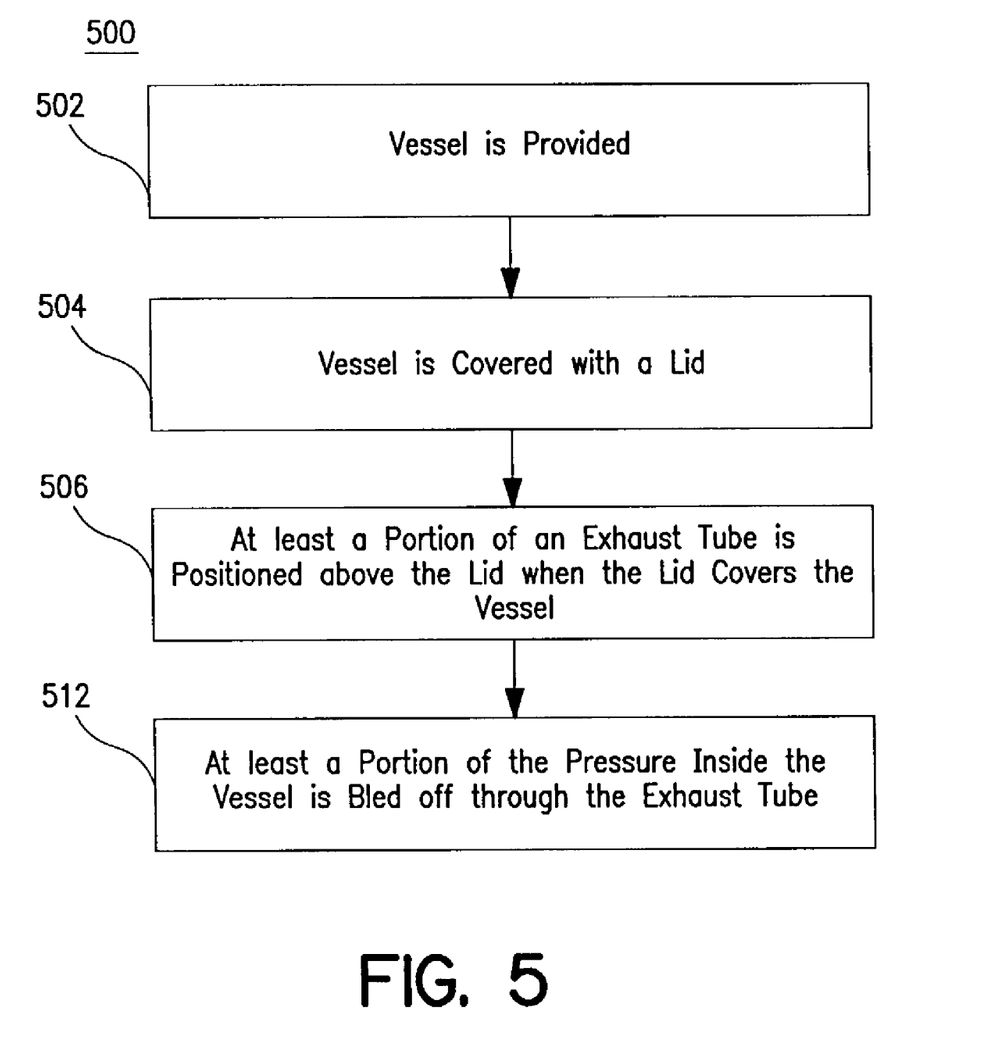
FIG. 5 is a flow chart of a method for reducing pressure according to an embodiment of the present invention.

Referring to FIG. 5, a method 500 for reducing pressure is described. For example, method 500 may be a method for reducing or bleeding off pressure from a vessel, such as a cooking vessel. Alternatively, method 500 may be a method for reducing or bleeding off pressure from a vessel when employing a cooking apparatus 100 according to any of the above-described embodiments of the invention. In step 502, a vessel, such as a cooking vessel 102, may be provided. In step 504 cooking vessel 102 may be covered with a lid 104. In step 506, at least a portion of an exhaust tube 106 may be positioned above lid 104 when lid 104 covers cooking vessel 102. For example, a first end 106a of exhaust tube 106 having an opening formed therethrough may be positioned above lid 104. In step 512 at least a portion of a pressure inside cooking vessel 102 may be discharged through exhaust tube 106. For example, the pressure inside vessel 102 may be discharged through the opening formed through first end 106a of exhaust tube 106. Moreover, at least a portion of the pressure inside vessel 102 may be discharged during a cooking cycle, or may be discharged after a completion of the cooking cycle, or both. Method 500 also may include the step of providing a pressure regulator 126, which may be connected to or may be in communication with a second end 106b of exhaust tube 106, such that pressure regulator 126 may control the discharge of the pressure inside cooking vessel 102.

Figure 6:
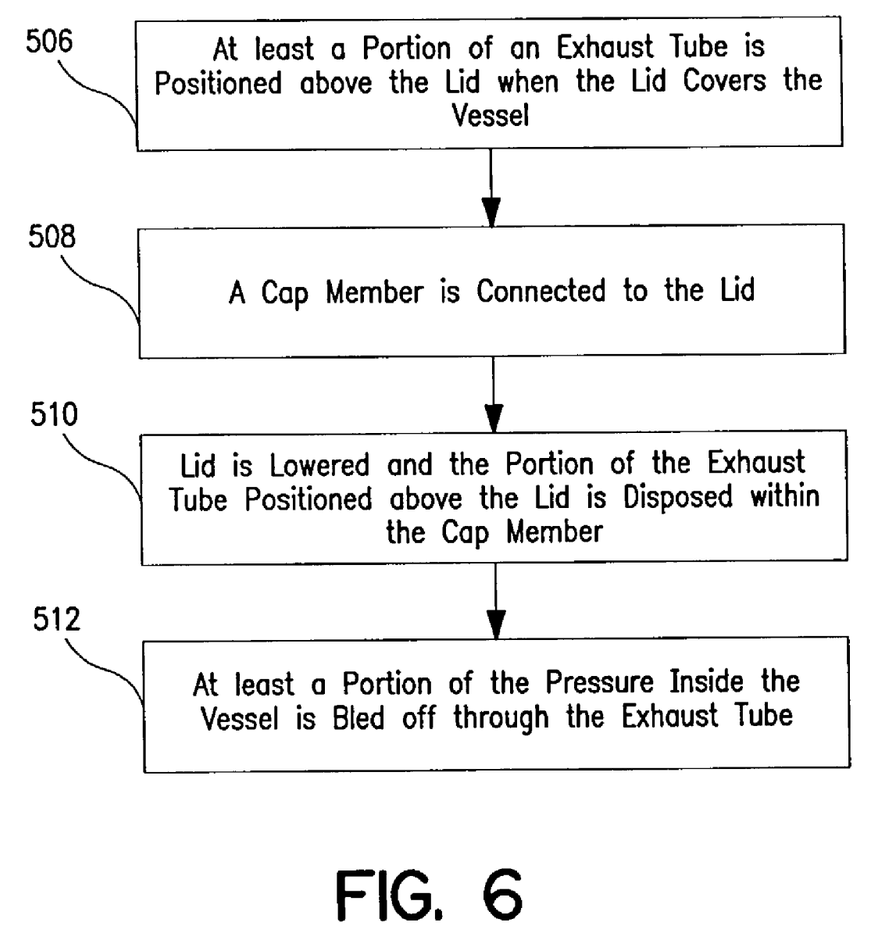
FIG. 6 is a flow chart of a method for reducing pressure according to an embodiment of the present invention.

Referring to FIG. 6, in an alternative embodiment, method 500 also may include steps 508 and 510. In step 508, a cap member 108 may be connected to lid 104, such that at least a portion of cap member 108 may be positioned above lid 104. In step 510, when lid 104 is lowered in order to cover cooking vessel 102, first end 106a of exhaust tube 106 may be disposed within cap member 108. In step 512 at least a portion of a pressure inside cooking vessel 102 may be discharged through exhaust tube 106. For example, the pressure inside vessel 102 may be discharged through the opening formed through first end 106a of exhaust tube 106. Moreover, at least a portion of the pressure inside vessel 102 may be discharged during a cooking cycle, or may be discharged after a completion of the cooking cycle, or both. Method 500 also may include the step of providing a pressure regulator 126, which may be connected to or may be in communication with a second end 106b of exhaust tube 106, such that pressure regulator 126 may control the discharge of the pressure inside cooking vessel 102.

Figure 7:
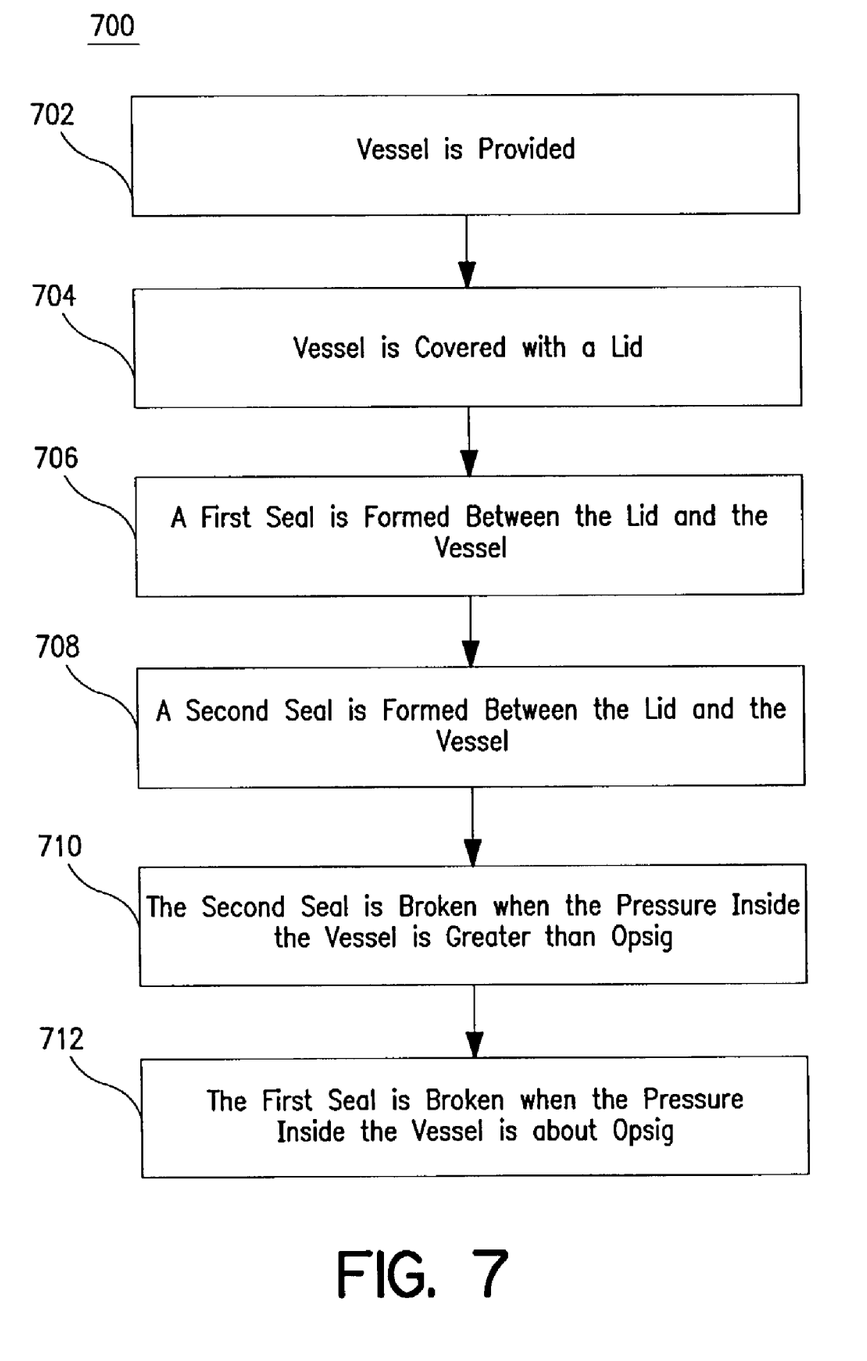
FIG. 7 is a flow chart of a method for covering a vessel according to an embodiment of the present invention.

Referring to FIG. 7, a method 700 for covering a vessel is described. For example, method 700 may be a method for covering a cooking vessel. In an embodiment, method 700 may be a method for covering a vessel when employing a cooking apparatus 100 according to any of the above-described embodiments of the invention. In step 702, a vessel, such as a cooking vessel 102, may be provided. The step of providing cooking vessel 102 may include the steps of forming a first tapered portion 102a on cooking vessel 102, and further may include the step of forming a second tapered portion 102b on cooking vessel 102. In step 704 cooking vessel 102 may be covered with a lid 104. In step 706, a first seal may be formed between cooking vessel 102 and lid 104. Forming the first seal between cooking vessel 102 and lid 104 may include the step of forming a first contact means, such as a first O-ring gasket, on or around lid 104. In an embodiment, a first contact point 110a of the first contact means may be formed substantially opposite a second contact point 110b of the first contact means. Forming the first seal also may include the steps of contacting first contact point 110a and second contact point 110b with first tapered portion 102a and second tapered portion 102b, respectively.

In step 708, a second seal may be formed between cooking vessel 102 and lid 104. Forming the second seal between cooking vessel 102 and lid 104 may include the step of forming a second contact means, such as a second O-ring gasket, on or around lid 104. In an embodiment, a third contact point 110c of the second contact means may be formed substantially opposite a fourth contact point 110d of the second contact means. Forming the second seal also may include the steps of contacting third contact point 110c and fourth contact point 110d with first tapered portion 102a and second tapered portion 102b, respectively. In step 710, cooking vessel 102 may be uncovered by breaking the second seal when a pressure inside the vessel is greater than 0 psig. For example, the second seal may be broken when the pressure inside the vessel is about 2 psig. In step 712, cooking vessel 102 further may be uncovered by breaking the first seal when the pressure inside cooking vessel 102 is about 0 psig.

Figure 8:
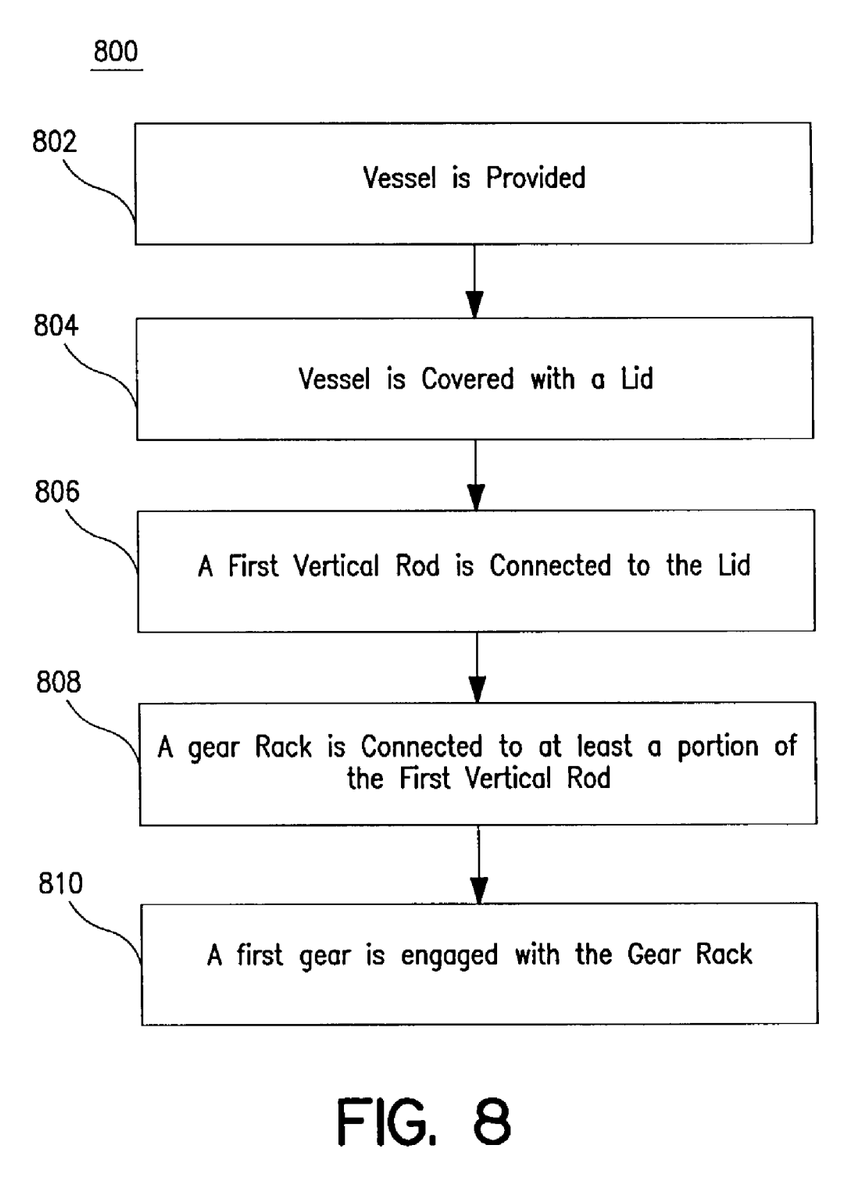
FIG. 8 is a flow chart of a method for moving a lid relative to a vessel according to an embodiment of the present invention.

Referring to FIG. 8, a method 800 moving a lid relative to a vessel is described. For example, method 800 may be a method for moving a lid relative to a cooking vessel. In an embodiment, method 800 may be a method for moving a lid relative to a vessel when employing a cooking apparatus 100 according to any of the above-described embodiments of the invention. In step 802, a vessel, such as a cooking vessel 102, may be provided. In step 804 cooking vessel 102 may be covered with a lid 104. In step 806, a first vertical rod 112a may be connected either directly or indirectly to lid 104. In step 808, a gear rack 120 may be connected to at least a portion of first vertical rod 112a. In step 810, a first gear 118 may be engaged with gear rack 120. Specifically, first gear 118 may comprise a first plurality of gear teeth 118a, which may engage gear rack 120.

Figure 9:
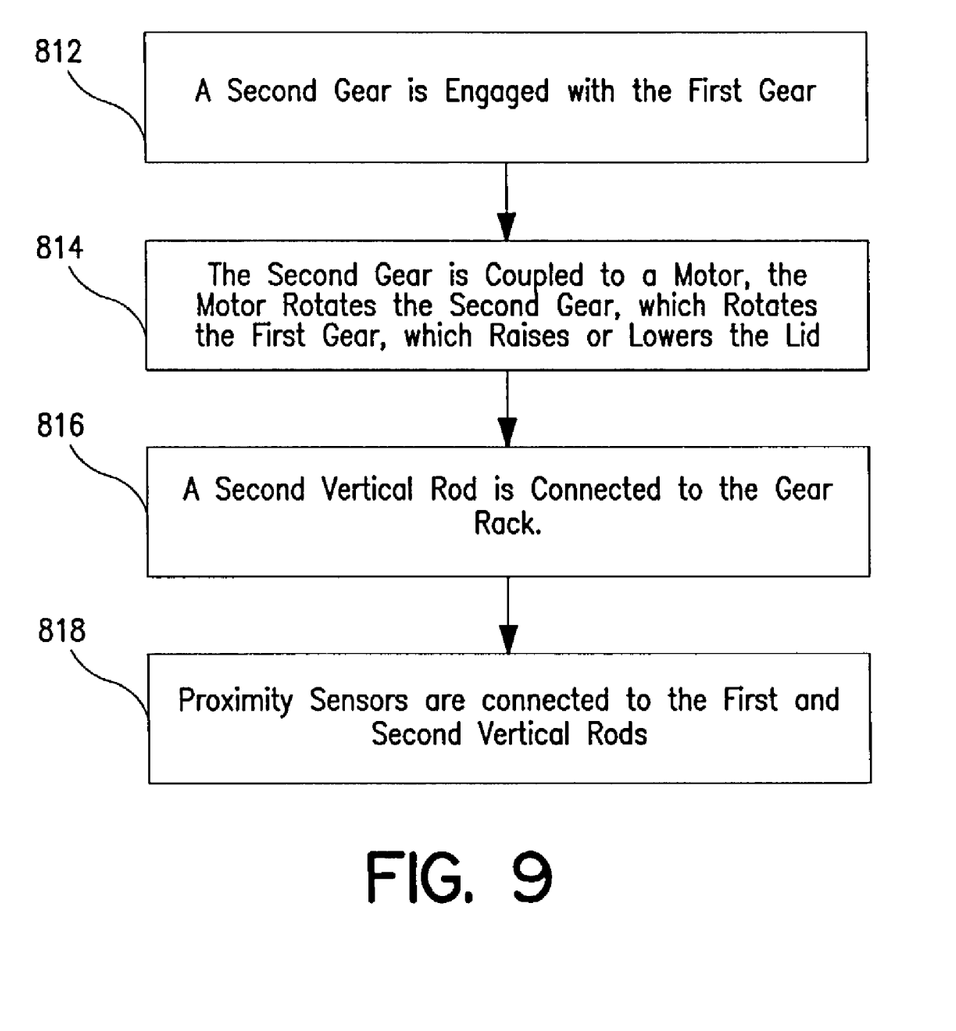
FIG. 9 is a flow chart of a method for moving a lid relative to a vessel according to an embodiment of the present invention.

Referring to FIG. 9, in step 812, a second gear 116 may be engaged with first gear 118. Specifically, second gear 116 may comprise a second plurality of gear teeth 116a, which may engage gear teeth 118a. In step 814, second gear 116 may be coupled to a motor 122, and motor 122 may rotate second gear 116. Moreover, the rotation of second gear 116 also may rotate first gear 118, which may raise or lower first vertical rod 112a, depending on a direction of rotation of first gear 118. In addition, raising or lowering first vertical rod 112a also may raise or lower lid 104. In step 816, a second vertical rod 112b may connected either directly or indirectly to lid 104, and also may be connected to gear rack 120. In step 818, a first proximity sensor 128a may be connected or disposed on first vertical rod 112a. First proximity sensor 128 may monitor a position of first vertical rod 112a. Similarly, a second proximity sensor (not shown) may be connected or disposed on second vertical rod 112a, and may monitor a position of first vertical rod 112a.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What is claimed is:

1. A cooking apparatus comprising:
a cooking vessel;
a lid for covering said cooking vessel;
an exhaust tube for bleeding off pressure within said cooking vessel, wherein at least a portion of said exhaust tube is positioned above said lid when said lid covers said cooking vessel; and
a cap member connected to said lid, wherein at least a portion of said cap member is positioned above said lid, and when said lid covers said cooking vessel said portion of said exhaust tube positioned above said lid is disposed within said portion of said cap member positioned above said lid.

2. The apparatus of claim 1, further comprising a pressure regulator positioned outside said cooking vessel for controlling a pressure level inside said cooking vessel, wherein said exhaust tube comprises:
a first end disposed within said cap member; and
a second end in communication with said pressure regulator.

3. The apparatus of claim 2, wherein said pressure regulator controls said pressure level inside said cooking vessel during a cooking cycle.

4. The apparatus of claim 3, wherein said pressure regulator controls said pressure level inside said cooking vessel subsequent to a completion of said cooking cycle.

5. The apparatus of claim 1, further comprising:
a first sealing means for forming a first seal between said cooking vessel and said lid; and
a second sealing means for forming a second seal between said cooking vessel and said lid.

6. The apparatus of claim 5, wherein said cooking vessel comprises a first tapered portion and said first sealing means comprises a first contact means formed on or around said lid, wherein said first contact means comprises a first contact point.

7. The apparatus of claim 6, wherein said cooking vessel further comprises a second tapered portion and said first contact means further comprises a second contact point formed substantially opposite said first contact point, wherein a contact between said second tapered portion and said second contact point and a contact between said first tapered portion and said first contact point forms said first seal.

8. The apparatus of claim 6, wherein said second sealing means comprises a second contact means formed on or around said lid.

9. The apparatus of claim 7, wherein said second sealing means comprises a second contact means formed on or around said lid, wherein said second contact means comprises a third contact point.

10. The apparatus of claim 9, wherein said second contact means further comprises
a fourth contact point formed substantially opposite said third contact point, wherein a contact between said second tapered portion and said fourth contact point and a contact between said first tapered portion and said third contact point forms said second seal.

11. The apparatus of claim 10, wherein said first contact means comprises a first O-ring gasket and said second contact means comprises a second O-ring gasket.

12. The apparatus of claim 11, wherein said first O-ring gasket is positioned below said second O-ring gasket.

13. The apparatus of claim 12, wherein said second seal between said lid and said cooking vessel is broken when said pressure level inside said cooking vessel is greater than 0 psig.

14. The apparatus of claim 13, wherein said second seal between said lid and said cooking vessel is broken when said pressure level inside said cooking vessel is about 2 psig and said first seal between said lid and said cooking vessel is broken when said pressure level inside said cooking vessel is about 0 psig.

15. The apparatus of claim 1, further comprising:
a first vertical rod connected to said lid;
a gear rack connected to at least a portion of said first vertical rod;
a first gear comprising a first plurality of gear teeth, wherein said first gear teeth engage said gear rack; and
means for rotating said first gear, wherein said rotation of said first gear raises or lowers said lid.

16. The apparatus of claim 15 wherein said means for rotating said first gear comprises a second gear, wherein said second gear comprises a second plurality of gear teeth and said second plurality of gear teeth engage said first plurality gear teeth.

17. The apparatus of claim 16, wherein said means for rotating said first gear further comprise a motor coupled to said second gear and said motor rotates said second gear, wherein said rotation of said second gear rotates said first gear.

18. The apparatus of claim 17, further comprising a second vertical rod connected to said lid, wherein said gear rack is connected to at least a portion of said second vertical rod.

19. The apparatus of claim 18, wherein said second vertical rod is positioned substantially opposite said first vertical rod.

20. The apparatus of claim 18, wherein during a cooking operation, said first plurality of gear teeth maintain said first seal between said lid and said cooking vessel and said second seal between said lid and said cooking vessel.

21. The apparatus of claim 18, further comprising:
a first proximity sensor connected to said first vertical rod; and
a second proximity sensor connected to said second vertical rod, wherein said first proximity sensor monitors a position of said first vertical rod and said second proximity sensor monitors a position of said second vertical rod.

22. The apparatus of claim 21, wherein said first proximity sensor and said second proximity sensor stop a raising of said lid when said lid reaches a predetermined height.

23. A cooking apparatus comprising:
a cooking vessel;
a lid for covering said cooking vessel;
a first sealing means for forming a first seal between said cooking vessel and said lid; and
a second sealing means for forming a second seal between said cooking vessel and said lid, wherein said first seal is broken when the pressure level inside said cooking vessel is at a first pressure level and said second seal is broken when the pressure level inside said cooking vessel is at a second pressure level, and said first pressure level is less than said second pressure level.

24. The apparatus of claim 23, wherein said cooking vessel comprises a first tapered portion and said first sealing means comprises a first contact means formed on or around said lid, wherein said first contact means comprises a first contact point.

25. The apparatus of claim 24, wherein said cooking vessel further comprises a second tapered portion and said first contact means further comprises a second contact point formed substantially opposite said first contact point, wherein a contact between said second tapered portion and said second contact point and a contact between said first tapered portion and said first contact point forms said first seal.

26. The apparatus of claim 25, wherein said first tapered portion and said second tapered portion are formed around a circumference of a lid portion of said cooking vessel.

27. The apparatus of claim 25, wherein said second sealing means comprises a second contact means formed on or around said lid, wherein said second contact means comprises a third contact point.

28. The apparatus of claim 27, wherein said second contact means further comprises a fourth contact point formed substantially opposite said third contact point, wherein a contact between said second tapered portion and said fourth contact point and a contact between said first tapered portion and said third contact point forms said second seal.

29. The apparatus of claim 28, wherein said first contact means comprises a first O-ring gasket and said second contact means comprises a second O-ring gasket.

30. The apparatus of claim 29, wherein said first O-ring gasket is positioned below said second O-ring gasket.

31. The apparatus of claim 23, wherein said second seal between said lid and said cooking vessel is broken when said pressure level inside said cooking vessel is greater than 0 psig.

32. The apparatus of claim 31, wherein said second seal between said lid and said cooking vessel is broken when said pressure level inside said cooking vessel is about 2 psig and said first seal between said lid and said cooking vessel is broken when said pressure level inside said cooking vessel is about 0 psig.

33. The apparatus of claim 23, further comprising:
a first vertical rod connected to said lid;
a gear rack connected to at least a portion of said first vertical rod;
a first gear comprising a first plurality of gear teeth, wherein said first gear teeth engage said gear rack; and
means for rotating said first gear, wherein said rotation of said first gear raises or lowers said lid.

34. The apparatus of claim 33, wherein said means for rotating said first gear comprises a second gear, wherein said second gear comprises a second plurality of gear teeth and said second plurality of gear teeth engage said first plurality gear teeth.

35. The apparatus of claim 34, wherein said means for rotating said first gear further comprises a motor coupled to said second gear and said motor rotates said second gear, wherein said rotation of said second gear rotates said first gear.

36. The apparatus of claim 35, further comprising a second vertical rod connected to said lid, wherein said gear rack is connected to at least a portion of said second vertical rod.

37. The apparatus of claim 36, wherein said second vertical rod is positioned substantially opposite said first vertical rod.

38. The apparatus of claim 26, wherein during a cooking operation, said first plurality of gear teeth maintain said first seal between said lid and said cooking vessel and said second seal between said lid and said cooking vessel.

39. The apparatus of claim 36, further comprising:
a first proximity sensor connected to said first vertical rod; and
a second proximity sensor connected to said second vertical rod, wherein said first proximity sensor monitors a position of said first vertical rod and said second proximity sensor monitors a position of said second vertical rod.

40. The apparatus of claim 39, wherein said first proximity sensor and said second proximity sensor stop a raising of said lid when said lid reaches a predetermined height.

41. A cooking apparatus comprising:
a cooking vessel;
a lid for covering said cooking vessel;
an exhaust tube for bleeding off pressure within said cooking vessel, wherein at least a portion of said exhaust tube is positioned above said lid when said lid covers said cooking vessel;
a first means for forming a first seal between said cooking vessel and said lid;
a second sealing means for forming a second seal between said cooking vessel and said lid;
a first vertical rod connected to said lid;
a gear rack connected to at least a portion of said first vertical rod;
a first gear comprising a first plurality of gear teeth, wherein said first gear teeth engage said gear rack; and
means for rotating said first gear, wherein said rotation of said first gear raises or lowers said lid.

42. A method for reducing pressure comprising the steps of:
providing a vessel;
covering said vessel with a lid;
positioning at least a portion of an exhaust tube above said lid when said lid covers said vessel;
bleeding off at least a portion of said pressure inside said vessel through said exhaust tube; and
connecting a cap member to said lid, wherein the step of connecting said cap member comprises the step of disposing said portion of said exhaust tube positioned above said lid within said portion of said cap member positioned above said lid when said lid covers said vessel.

43. The method of claim 42, wherein the step of bleeding off at least a portion of said pressure inside said vessel comprises the step of positioning a pressure regulator outside said vessel, wherein said pressure regulator controls a pressure level inside said vessel.

44. The method of claim 43, wherein the step of bleeding off at least a portion of said pressure inside said vessel further comprises the step of bleeding off at least a portion of said pressure inside said vessel during a cooking cycle.

45. The method of claim 43, wherein the step of bleeding off at least a portion of said pressure inside said vessel further comprises the step of substantially bleeding off said pressure inside said vessel subsequent to the completion of a cooking cycle.

46. The method of claim 44, wherein the step of bleeding off at least a portion of said pressure inside said vessel further comprises the step of substantially bleeding off said pressure inside said vessel subsequent to the completion of a cooking cycle.

47. The method of claim 42, wherein said vessel is a cooking vessel.

48. A method for covering a vessel comprising the steps of:
   providing a vessel;
   covering said vessel with a lid;
   forming a first seal between said vessel and said lid;
   forming a second seal between said vessel and said lid; and
   uncovering said vessel, wherein the step of uncovering said vessel comprises the steps of:
      breaking said first seal when the pressure level inside said cooking vessel is at a first pressure level; and
      breaking said second seal when the pressure level inside said cooking vessel is at a second pressure level, wherein said first pressure level is less than said second pressure level.

49. The method of claim 48, wherein the step of providing said vessel comprises the step of forming a first tapered portion on said vessel and the step of forming said first seal comprises the step of forming a first contact means on or around said lid, wherein said first contact means comprises a first contact point and a second contact point formed substantially opposite said first contact point.

50. The method of claim 49, wherein the step of providing said vessel further comprises the step of forming a second tapered portion on said vessel and the step of forming said first seal further comprises the steps of:
   contacting said first contact point with said first tapered portion; and
   contacting said second contact point with said second tapered portion, wherein contacting said second contact point with said second tapered portion and contacting said first contact point with said first tapered portion forms said first seal.

51. The method of claim 50, wherein the step of forming said second seal comprises the step of forming a second contact means on or around said lid, wherein said second contact means comprises a third contact point and a fourth contact point formed substantially opposite said third contact point.

52. The method of claim 51, wherein the step of forming said second seal further comprises the steps of:
   contacting said third contact point with said first tapered portion; and
   contacting said fourth contact point with said second tapered portion, wherein contacting said fourth contact point with said second tapered portion and contacting said third contact point with said first tapered portion forms said second seal.

53. The method of claim 52, wherein said first contact means comprises a first O-ring gasket and said second contact means comprises a second O-ring gasket.

54. The method of claim 53, wherein said first O-ring gasket is positioned below said second O-ring gasket.

55. The method of claim 48, wherein the step of uncovering said vessel comprises the step of:
   breaking said second seal between said lid and said vessel when said pressure level inside said vessel is greater than 0 psig.

56. The method of claim 48, wherein the step of uncovering said vessel comprises the steps of:
   breaking said second seal between said lid and said vessel when said pressure level inside said vessel is about 2 psig; and
   breaking said first seal between said lid and said vessel when said pressure level inside said vessel is about 0 psig.

57. The method of claim 48, wherein said vessel is a cooking vessel.

* * * * *